W. M. CARSON.
CUSPIDOR ATTACHMENT FOR VEHICLES.
APPLICATION FILED OCT. 14, 1913.
1,095,813.
Patented May 5, 1914.
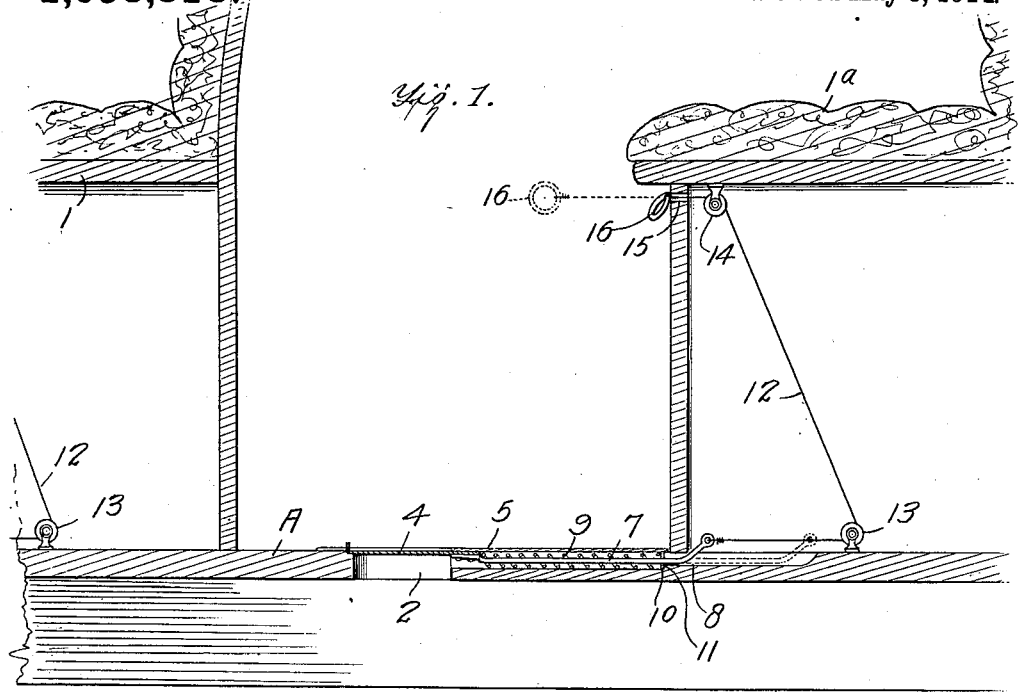
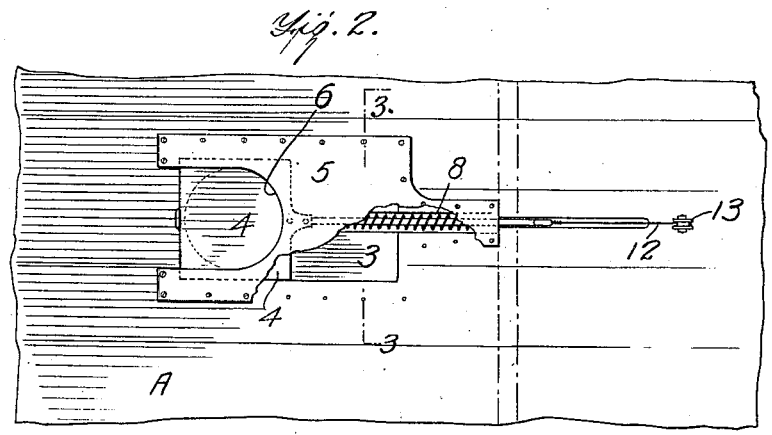
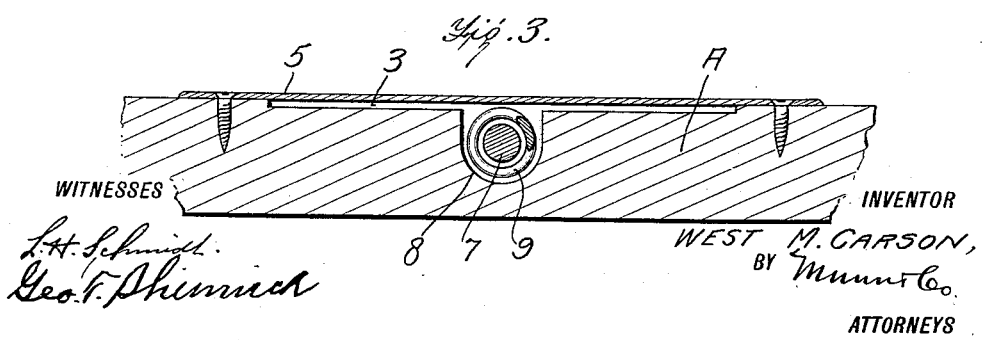
WITNESSES
INVENTOR
WEST M. CARSON,
BY Munn & Co.
ATTORNEYS

UNITED STATES PATENT OFFICE.

WEST MONTGOMERY CARSON, OF STOVALL, MISSISSIPPI.

CUSPIDOR ATTACHMENT FOR VEHICLES.

1,095,813.   Specification of Letters Patent.   Patented May 5, 1914.

Application filed October 14, 1913. Serial No. 795,067.

*To all whom it may concern:*

Be it known that I, WEST M. CARSON, a citizen of the United States, and a resident of Stovall, in the county of Coahoma and State of Mississippi, have made certain new and useful Improvements in Cuspidor Attachments for Vehicles, of which the following is a specification.

In carrying out my invention I provide the floor of an automobile or other vehicle with an opening which is normally closed by a spring door that is adapted to be retracted and opened by pulling a device connected with it and easily accessible to the occupant of the vehicle.

The invention will be hereinafter fully described with reference to the accompanying drawing, in which—

Figure 1 is a longitudinal vertical section of a portion of the body of a car with my invention applied thereto, Fig. 2 is a top plan view showing the invention applied to the floor of a car with a portion broken away to more clearly illustrate the manner of assembling the parts, and Fig. 3 is a cross section on the line 3—3 of Fig. 2.

The invention will be found especially useful in connection with railway coaches and street cars, as well as automobiles and other vehicles.

A indicates the floor of the car, and 1, 1$^a$, the front and rear seats. An opening 2 is formed in the floor between the seats, and a shallow recess 3 extends rearward therefrom and also on the sides of the opening. A door 4 is arranged to slide in such a recess, and normally covers the opening 2 in the car floor. A plate 5 is secured to the floor and closes the recess on the upper side. It is cut out at the front end as shown at 6, and the notch thus formed registers with the floor opening 2. It will be understood that the door 4 is held and guided in the recess 3 between the car floor and the plate 5.

A longitudinal groove 7 is formed in the floor of the car, and extends through the recess 3 and beneath the rear seat 1$^a$. Such groove receives the rod 8 which is connected with the door 4. A spiral spring 9 surrounds the rod 8, one end of the same bearing against the door, and the other end against a washer 10, which is loosely mounted upon the rod and bears against a shoulder 11 formed in the groove 8. The free end of the rod extends rearward beneath the seat 1$^a$ and a wire cord 12 extends therefrom and passes around the pulley 13 on the floor of the car, and thence over the pulley 14 secured under the seat 1$^a$, and thence through an opening 15 in the front of the latter. A ring 16 is attached to the free end of the wire or cord 12. This arrangement enables the occupant of the car to draw the door 4 rearwardly and thus uncover the opening 2, by pulling the wire or cord 12. Upon release of the wire or cord, the spring 9, which was obviously compressed as the cover 4 moved, forces the door back to its normal position, thereby closing the opening 2.

From the foregoing it will be seen that I have provided a simple device which can be applied to vehicle bodies so that an occupant may expectorate through the opening in the bottom of the car or other vehicle by simply pulling the cord or wire 12, thus retracting the door, which closes automatically upon release of the cord or wire.

It will be understood that, if desired, a receptacle for expectorations may be supported detachably directly under the opening 2 in the car body.

I claim:

1. A vehicle body having an opening in its floor, a shallow recess extended on the sides of, and rearward from, such opening, a plate covering said recess, a door or cover for the opening which is held slidably in such recess, a spring tending to hold the door normally closed, and means connected with the door and extending upward to a point beneath the driver's seat, where it is accessible, as described.

2. A vehicle body provided with an opening in the floor, a slidable door held in guides and adapted to close said opening, a rod extending rearward from the door, a spring applied for holding the door normally closed, and means connected with the rod and extending to a point adjacent to a seat of the vehicle, for retracting the door against the tension of the spring.

3. The combination, with a vehicle body having an opening in its floor and adjacent to a seat, of a slidable door which normally closes such opening, the floor being recessed to receive and guide the door, a plate forming the upper side of such recess, a rod attached to the door and extending rearward, a spiral spring encircling said rod and exerting pressure against the door, a cord connected with the rear end of the rod and extending upward over guides and projecting from a seat where it is easily accessible to an occupant of the car, as described.

WEST MONTGOMERY CARSON.

Witnesses:
A. J. OSWALT,
J. CUNNINGHAM,
W. B. BARR.

Copies of this patent may be obtained for five cents each, by addressing the "Commissioner of Patents, Washington, D. C."